H. W. WHITE.

CHIN-RESTS FOR VIOLINS.

No. 6,812. Reissued Dec. 21, 1875.

WITNESSES.

Silas E. Kelsey

Henry L. Slayton.

INVENTOR.

Hiram W. White

By Gridley & Warner

Attys.

N. PETERS, PHOTO-LITHOGRAPHER, WASHINGTON, D. C.

UNITED STATES PATENT OFFICE.

HIRAM W. WHITE, OF OSKALOOSA, IOWA, ASSIGNOR TO LYON & HEALEY, OF CHICAGO, ILLINOIS.

IMPROVEMENT IN CHIN-RESTS FOR VIOLINS.

Specification forming part of Letters Patent No. 155,780, dated October 6, 1874; reissue No. 6,812, dated December 21, 1875; application filed November 20, 1875.

*To all whom it may concern:*

Be it known that I, HIRAM W. WHITE, of Oskaloosa, in the county of Mahaska and State of Iowa, (late of Anderson, in the county of Madison and State of Indiana,) have invented a new and useful Improvement in Chin-Rests for Violins, of which the following is a full, clear, and exact description, which will enable others skilled in the art to which my invention appertains to make and use the same, reference being had to the accompanying drawing forming a part hereof, in which—

Figure 1:
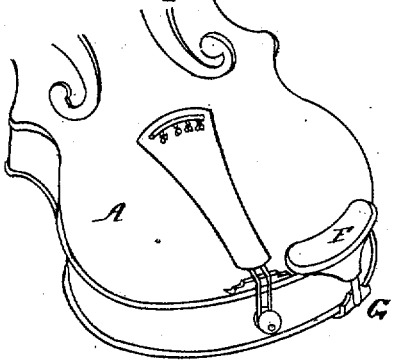
Figure 2:
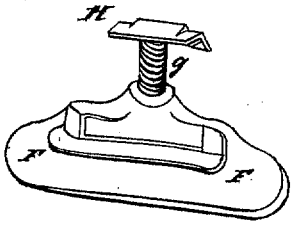
Figure 3:
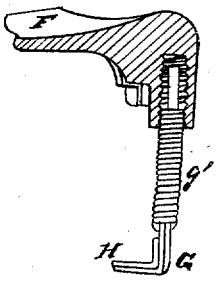

Figure 1 is a perspective view of a portion of a violin, with my improved chin-rest applied. Fig. 2 is a perspective view of the chin-rest and its accessories, showing the screw-shank made in the form of a spiral spring. Fig. 3 is a longitudinal section of the device in the form shown in Fig. 2, and Fig. 4 is a longitudinal section thereof in the form shown in Fig. 1.

Like letters of reference indicate like parts.

The subject of my invention is a chin-rest, provided with a hook-formed clamp connected to said rest by a shank, and to a spring to facilitate its adjustment, as hereinafter described.

Figure 4:
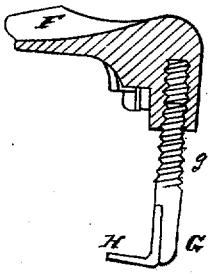

In the drawing, F represents the chin-rest, which is provided with an adjustable shank, G, either formed with a simple screw-thread, as shown in Figs. 1 and 4, or attached to a spiral spring, $g'$, which itself constitutes the screw, either screw $g$ or $g'$ fitting within a threaded aperture in the base of the chin-rest. The head H of the shank G is extended laterally in proper shape to adapt it to serve as a clamp to secure the chin-rest in proper position on the base of the violin. The screw $g$ or $g'$ permits the adjustment of the clamp to suit the varying depth of different instruments, while the spring $g'$, being attached at its lower end to the shank G, is capable of a downwardly-yielding movement, and thereby renders the clamp H self-adjusting within certain limits, and causes it to bear on the violin with a yielding instead of a rigid pressure. The spring also facilitates the application and removal of the clamp.

In use the clamp H is applied to the under side of the violin, as shown in Fig. 1, and the chin-rest F is readily sprung over the edge of the violin, and is of great utility in preventing the violin from slipping from under the chin, while being played on, and to take the wear from the pressure of the chin.

Having thus described my invention, what I claim as new, and desire to secure by Letters Patent, is—

1. A violin chin-rest, provided with a yielding and self-adjustable clamp, for the purpose of thereby retaining the rest upon the instrument, and rendering the same applicable to instruments of varying depth, substantially as described.

2. The combination of the chin-rest F, shank G, provided with the head or clamp H, and spring $g'$, substantially as and for the purpose specified.

HIRAM W. WHITE.

Witnesses:
JOHN A. HOFFMAN,
S. H. CHAPMAN.